(12) United States Patent
Haga et al.

(10) Patent No.: US 11,167,805 B2
(45) Date of Patent: Nov. 9, 2021

(54) VEHICLE FRONT STRUCTURE

(71) Applicant: HONDA MOTOR CO., LTD., Tokyo (JP)

(72) Inventors: Akira Haga, Wako (JP); Takayuki Sekiya, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 44 days.

(21) Appl. No.: 16/895,068

(22) Filed: Jun. 8, 2020

(65) Prior Publication Data

US 2020/0391804 A1 Dec. 17, 2020

(30) Foreign Application Priority Data

Jun. 11, 2019 (JP) .............................. JP2019-109047

(51) Int. Cl.
*B62D 25/08* (2006.01)
*B62D 25/04* (2006.01)
*B62D 21/11* (2006.01)
*B62D 21/15* (2006.01)

(52) U.S. Cl.
CPC ............ *B62D 25/088* (2013.01); *B62D 21/11* (2013.01); *B62D 25/04* (2013.01); *B62D 25/081* (2013.01); *B62D 21/152* (2013.01)

(58) Field of Classification Search
CPC ...... B62D 25/088; B62D 21/11; B62D 25/04; B62D 25/081; B62D 21/152; B62D 25/08; B62D 21/00
See application file for complete search history.

(56) References Cited

U.S. PATENT DOCUMENTS

2018/0304931 A1* 10/2018 Kato ...................... B62D 25/08
2018/0370571 A1   12/2018 Sekiya et al.

FOREIGN PATENT DOCUMENTS

JP        2019-006311 A    1/2019

* cited by examiner

*Primary Examiner* — Lori L Lyjak
(74) *Attorney, Agent, or Firm* — Rankin, Hill & Clark LLP

(57) ABSTRACT

A vehicle front structure having an upper member joined to a damper base and being capable of absorbing a larger load when a vehicle is in full-lap collision or offset collision and comprises a pair of left and right upper members disposed respectively on left and right sides of the vehicle a pair of left and right damper bases in each of which a damper is fitted, wherein each of the upper members includes a main upper member portion having a cross section in a rectangular shape that is perpendicular to an axis thereof, the left and right damper bases are joined respectively to the left and right upper members at upper portions of the main upper member portions, and each of the main upper member portions includes a lower portion having a pair of indented portions formed at both corner portions in a vehicle width direction of the lower portion of and a step portion formed to extend in the vehicle width direction and connect the pair of the indented portions.

7 Claims, 5 Drawing Sheets

VEHICLE FRONT STRUCTURE

CROSS REFERENCE TO RELATED APPLICATIONS

This application claims the foreign priority benefit under 35 U.S.C. § 119 of Japanese Patent Application No. 2019-109047 filed on Jun. 11, 2019, the disclosure of which is incorporated herein by reference.

TECHNICAL FIELD OF THE INVENTION

This invention relates to a vehicle front structure of a vehicle such as an electric vehicle which has a relatively small engine room disposed at a front portion of the vehicle.

BACKGROUND OF THE INVENTION

A vehicle front structure of a vehicle having a relatively small engine room disposed at its front portion includes a front side frame, an upper member positioned at a higher position and a lower member joined to the upper member, all of which have shorter longitudinal lengths. As a result, the vehicle front structure of this kind of the vehicle could not sufficiently absorb a collision load (collision energy) when the vehicle is in full-lap collision or offset collision. In addition, if a battery for driving is mounted in the vehicle, a vehicle body weight significantly increases and the collision load that has to be absorbed should increase. Furthermore, when the vehicle is in small-lap collision in which a small part of a front portion of the vehicle overlaps with and collides with an obstacle, the collision load that has to be absorbed further increases.

JP2019-6311A discloses as a means to increase the collision load to be absorbed, for instance, a vehicle front structure inclusive of a lower member that is in a pipe shape and joined to a vehicle-frontward end portion of an upper member and has a vehicle-frontward end portion to be displaced rearward to touch a tire when a collision load is applied.

However, when the upper member is joined to a damper base that has a high stiffness and a high strength, a joint portion between the upper member and the damper base hardly bends. In addition, for example, the upper member whose length in a vehicle front-rear direction is shortened does not bend as much as an upper member whose length in the vehicle front-rear direction is longer. As a result, a front portion of a vehicle with this vehicle front structure has difficulty in absorbing an increased amount of the collision load to be applied when the vehicle is in full-lap collision or offset collision (including small-lap collision).

SUMMARY OF THE INVENTION

The present invention has been created to work out a problem above mentioned and is intended to provide a vehicle front structure that has an upper member joined to a damper base and can absorb the increased amount of the collision load to be applied when the vehicle is in full-lap collision or offset collision (including small-lap collision).

In order to achieve the objective above described, the present invention provide a vehicle front structure comprising a pair of left and right upper members disposed respectively on left and right sides of a vehicle and extending in a vehicle front-rear direction, and a pair of left and right damper bases in each of which a damper is fitted, and the vehicle front structure has a feature of each of the upper members including a main upper member portion having a cross section in a rectangular shape that is perpendicular to an axis thereof, the left and right damper bases being joined respectively to upper portions of the main upper member portions, and each of the main upper member portions including a lower portion including a pair of indented portions formed at both left and right corner portions in a vehicle width direction of the lower portion of and a step portion formed to extend in the vehicle width direction and connect the pair of the indented portions.

The present invention enables a vehicle front structure that can absorb a larger load than the vehicle front structure of the prior art technology when a vehicle is in flat collision or in offset collision (including a small offset collision), even if an upper member is joined to a damper base.

DETAILED DESCRIPTION OF THE INVENTION

An embodiment of the present invention is described in detail with appropriate reference to the figures. In each of the figures, "Front-Rear" denotes a vehicle front-rear direction, "Left-Right" denotes a vehicle width direction (left-right direction) and "Up-Down" denotes a vertically up-down direction.

A vehicle, to which a vehicle front structure of an embodiment of the present invention is applied, has a vehicle body of a monocoque body. This vehicle body is symmetrical with respect to a center line that extends in the vehicle front-rear direction passing a center in the vehicle width direction and is not shown.

Figure 1:
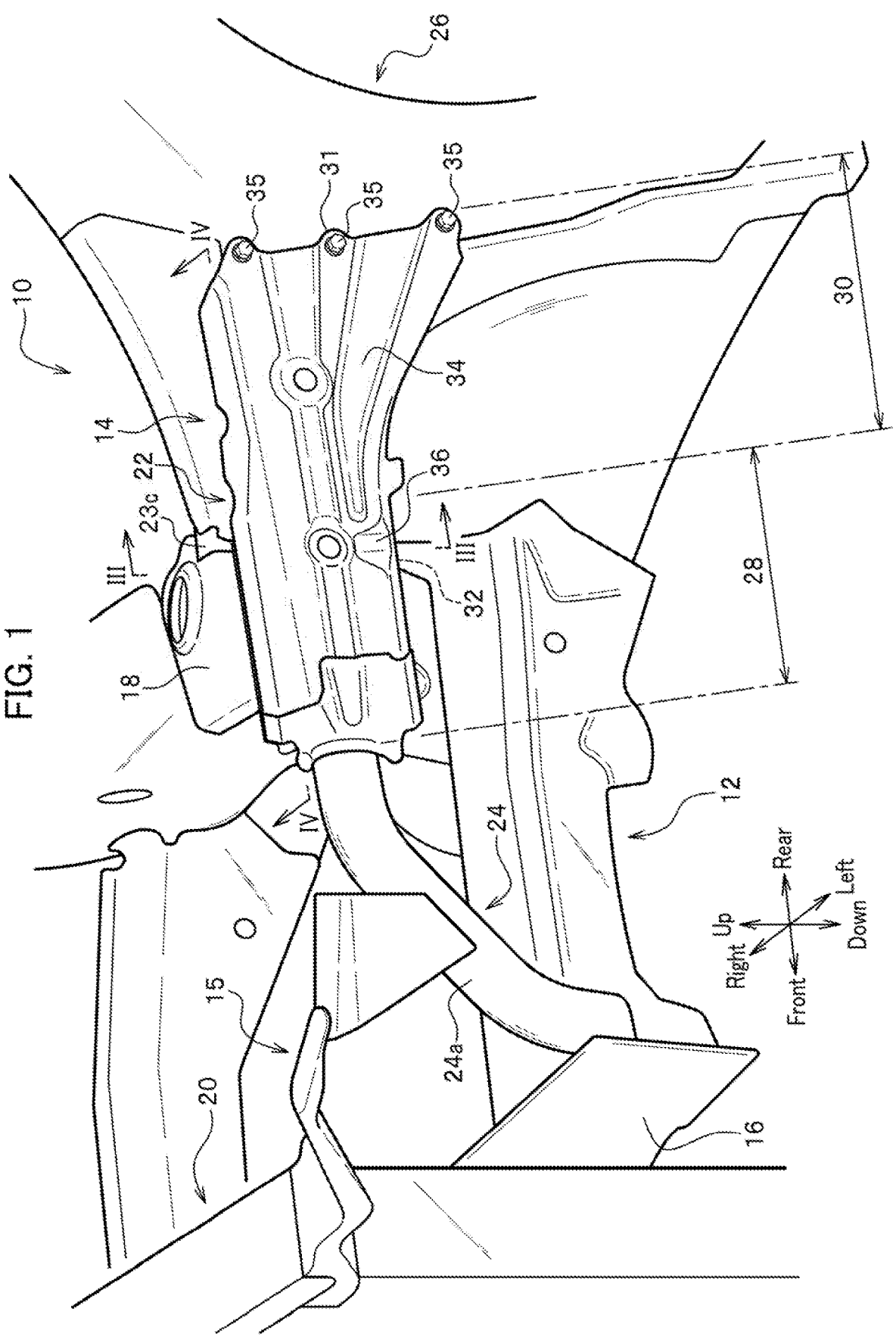
FIG. 1 is a general perspective view of a vehicle front structure of an embodiment of the present invention fitted at a front left side portion of a vehicle body.

As shown in FIG. 1, a vehicle front portion 10 includes a pair of left and right front side frames 12, 12, a pair of left and right upper members 14, 14, a pair of left and right outer members 16, 16, a pair of left and damper bases 18 and a front bulkhead 20. FIG. 1 shows only a front left side portion of a vehicle with the vehicle front structure and does not show a front right side portion of the vehicle.

The pair of left and right front side frames 12, 12 are disposed respectively on left and right sides of the vehicle body in the vehicle width direction. Each of the front side frames 12 has a vehicle-frontward end portion joined to the front bulkhead 20. In addition, each of the front side frames 12 has a vehicle-rearward end portion that is divided into two pieces joined to a cross member that is not shown.

The pair of left and right upper members 14, 14 are respectively joined to outer sides in the vehicle width direction of the pair of left and right front side frames 12, 12 and extend in the vehicle front-rear direction. Each of the upper members 14 includes an intermediate curved portion that is joined to an upper corner portion of the front bulkhead 20 through a joint member 15 extending inward in the vehicle width direction. The upper members 14 include vehicle-rearward end portions respectively joined to a pair of left and right front pillars 26. Tires, which are parts of left and right front wheels and not shown, are disposed respectively under the left and right upper members 14, 14.

As shown in FIG. 1, each of the upper members 14 includes a main upper member portion 22 and a frontward extending portion 24 extending frontward from the main upper member portion 22.

Figure 3:
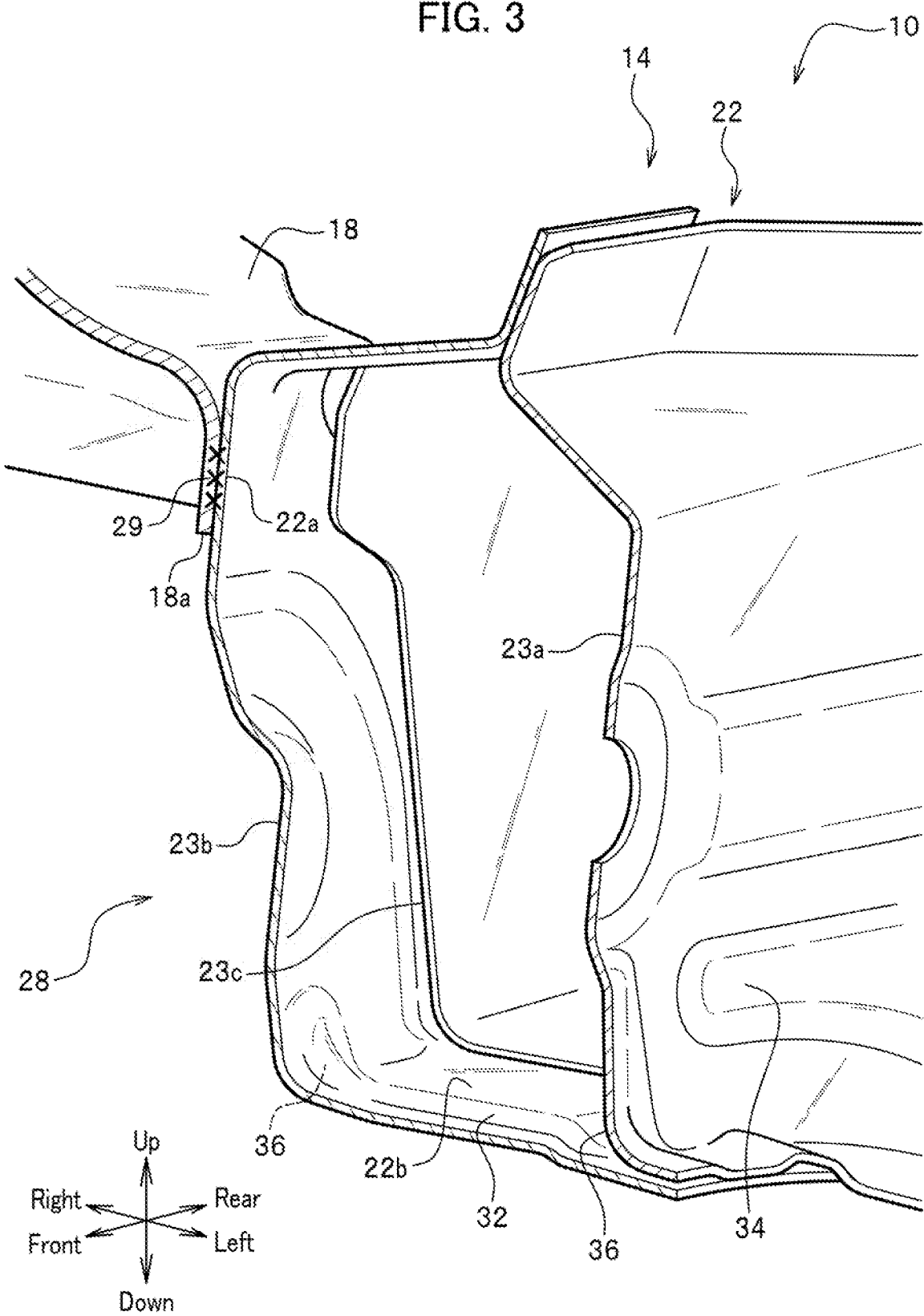
FIG. 3 is a cross sectional view of the vehicle front structure as described in FIG. 1 along a perpendicular plane on a line III-III.

Each main upper member portion 22 has a cross section in a rectangular shape that is perpendicular to an longitudinal axis of the main upper member portion 22 (See FIG. 3) and is disposed between the frontward extending portion 24 and the front pillar 26 in a manner that the longitudinal axis is more or less in parallel with the vehicle front-rear direction (See FIG. 1). As shown in FIG. 3, the main upper member portion 22 is formed by an upper member outer 23a, an upper member inner 23b and an upper member extending portion 23c.

The upper member outer 23a is disposed on an outer side in the vehicle width direction of the main upper member portion 22. The upper member inner 23b is disposed on an inner side in the vehicle width direction of the main upper member portion 22. The upper member extending portion 23c has a front portion disposed between the upper member outer 23a and the upper member inner 23b (See FIG. 3) and a rear upper portion extending to rearward of the damper base 18 (See FIG. 1 and FIG. 2). An inner side portion of the main upper member portion 22 is joined to the damper base 18 which has a high stiffness and a high strength and has a lower portion at which a damper not shown is fitted.

As shown in FIG. 1, the main upper member portion 22 includes a damper base joined portion 28 (referred to as a damper base joined zone 28 as well, hereinafter) and a cowl side portion 30, which are integrally formed and extend in the vehicle front-rear direction. The damper base joined portion 28 forms a front portion of the main upper member portion 22 and has a height dimension in the up-down direction that is constant or more or less constant in the vehicle front-rear direction, in contrast to the cowl side portion 30 to be described later.

As shown in FIG. 3, the damper base joined portion 28 includes a joint portion 29 at which a vehicle-width-direction-outer-end portion 18a of the damper base 18 is joined to an inner side portion in the vehicle width direction of an upper portion 22a of the main upper member portion 22. In addition, a step portion 32 (See FIG. 2) to be described later is formed at a lower portion of the damper base joined portion 28 (in a lower portion 22b of the main upper member portion 22) and extends in the vehicle width direction.

As shown in FIG. 1, the cowl side portion 30 forms a rear portion of the main upper member portion 22 and has a height dimension in the up-down direction increasing from its front portion toward its rear portion. A vehicle-rearward end portion 31 of the cowl side portion 30 is joined to the front pillar 26.

In addition, the cowl side portion 30 includes at least a raised portion 34 raised like a bead that is positioned on the outer side in the vehicle width direction of the cowl side portion 30. The raised portion extends rearward in the vehicle front-rear direction inclining downward. The vehicle-rearward end portion 31 of the cowl side portion 30 is bolted (joined) in the vicinity of the raised portion 34 to the front pillar 26 with bolts 35 and nuts (mechanical joining member).

As shown in FIG. 3 and FIG. 1, there are a pair of left and right indented portions 36, 36 formed respectively at left and right corner portions of a lower portion 22b of the main upper member portion 22. Each indented portion 36 is approximately in a trapezoidal shape (See FIG. 1) when it is viewed from its side and indented from an outer side of the main upper member portion 22 toward an inner side of the main upper member portion 22.

Figure 2:
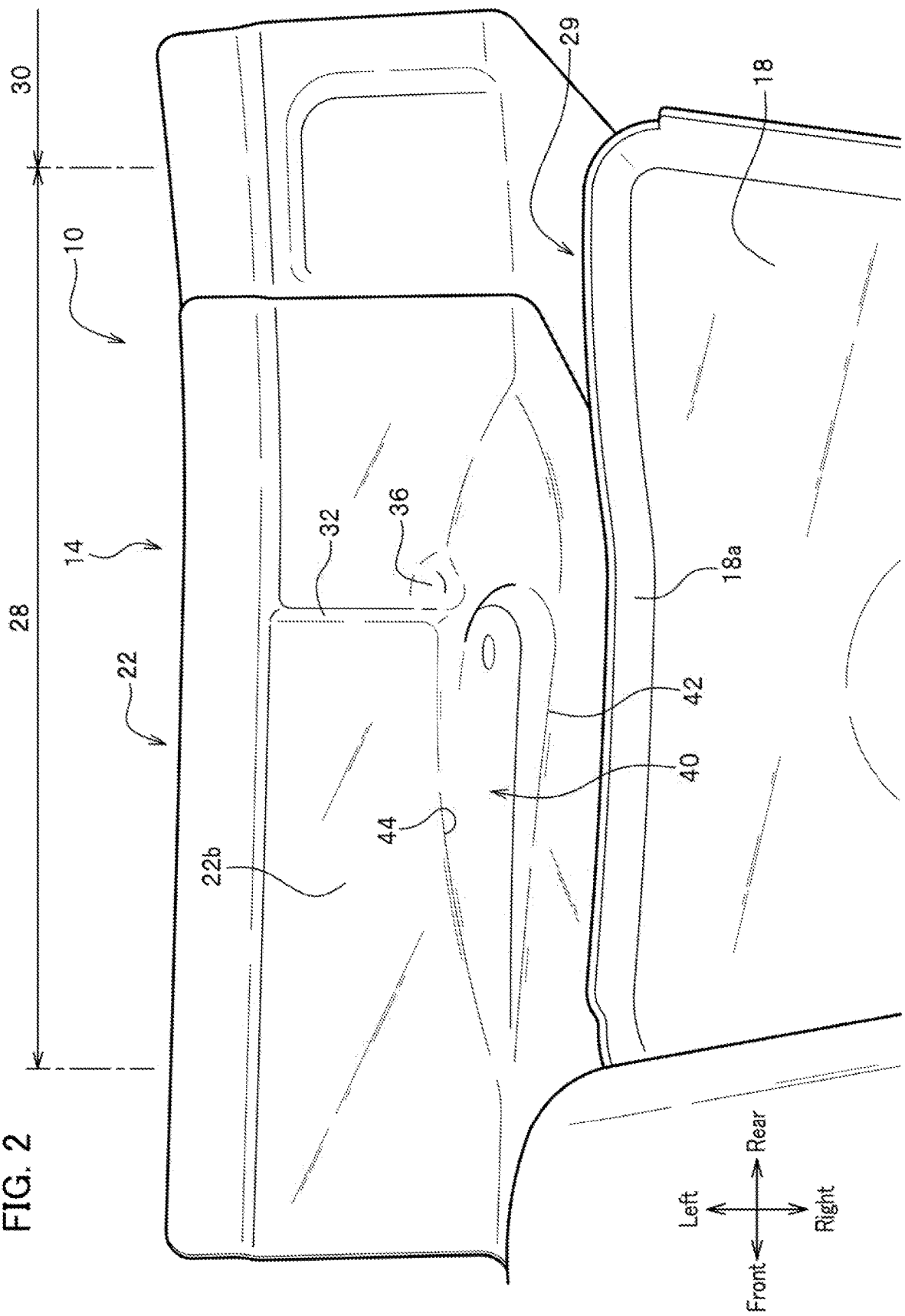
FIG. 2 is a bottom plan view of an upper member and a damper base that are disposed at a front portion of a vehicle and viewed from the ground on which a vehicle stays.

The step portion 32 is formed on the lower portion 22b of the main upper member portion 22 having a bottom face facing the ground and extends between the pair of left and right indented portions 36, 36 (See FIG. 3 and FIG. 2). The step portion 32 is a step extending straight in the vehicle width direction when it is viewed from the ground (See FIG. 2). The step portion 32 is formed in the damper base joined zone 28 positioned on the front side of the main upper member portion 22. The step portion 32 is formed in a manner that a front portion of the step portion 32 is closer to the ground than a rear portion of the step portion 32 is.

As shown in FIG. 2, the lower portion 22b, which extends inside the main upper member portion 22 in the vehicle width direction, has a recessed portion 40 that is recessed toward an inside of the main upper member portion 22 and has a ridge line that is seen curving in a bottom view of the main upper member portion 22. That is, in the bottom view of the main upper member portion 22 when it is viewed from under, the recessed portion 40 has a straight ridge portion 42 positioned at the inward side in the vehicle width direction of the recessed portion 40 and extending straight in the vehicle front-rear direction and a curved ridge portion 44 extending curving from a vehicle-frontward end of the straight ridge portion 42 to a vehicle-rearward end of the straight ridge portion 42 on an outer side of the straight ridge portion 42 in the vehicle width direction.

The indented portion 36 formed at the inner side in the vehicle width direction is positioned on the recessed portion 40, and an inward-end portion of the step portion 32 (end portion closer to the damper base 18) is connected to the recessed portion 40 (curved ridge portion 44). The recessed portion 40 elongates in the vehicle front-rear direction in the damper base joined zone 28 (See FIG. 2).

Figure 4:
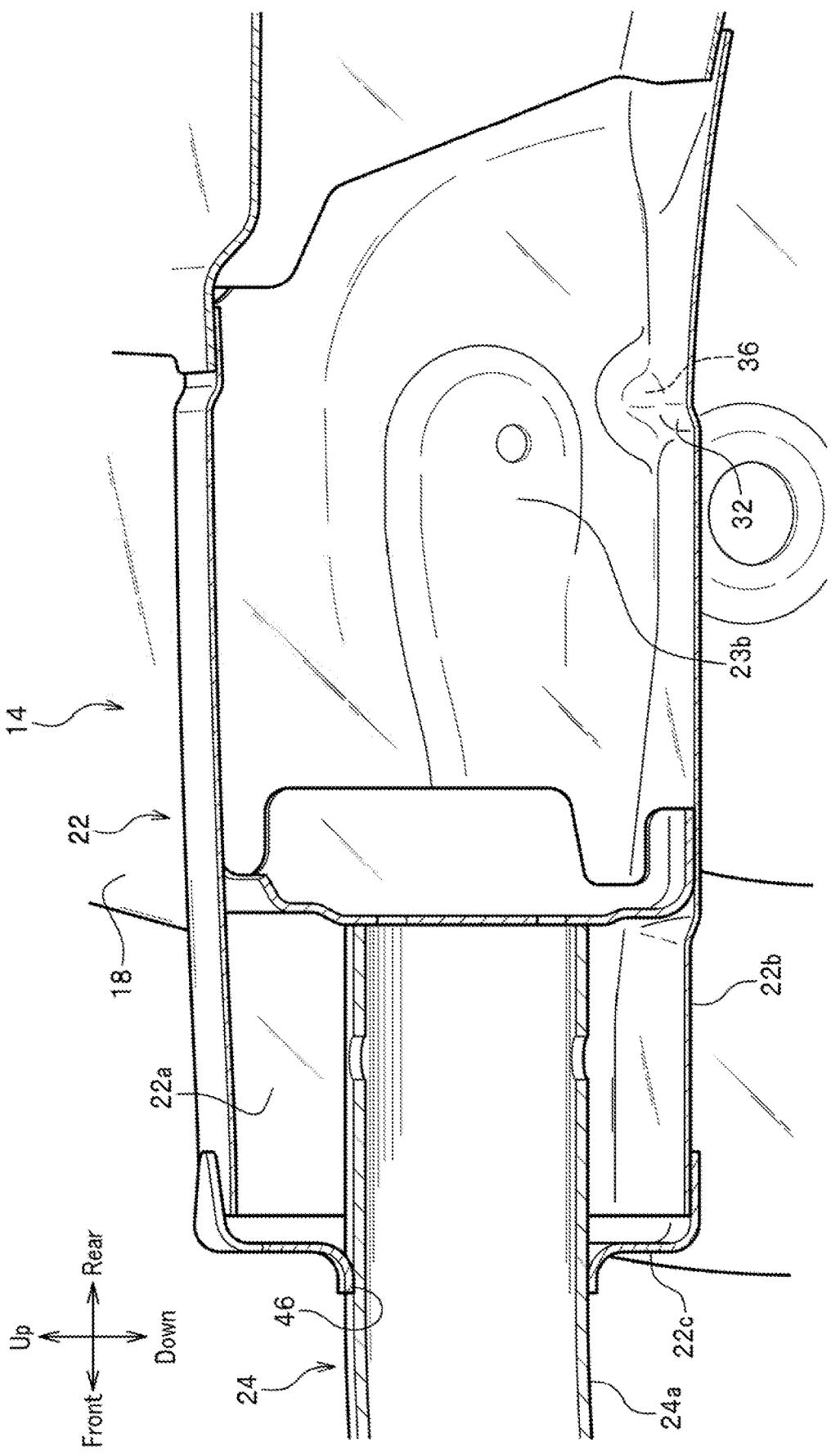
FIG. 4 is a cross sectional view of the vehicle front structure as described in FIG. 1 along a perpendicular plane on a line IV-IV.

As shown in FIG. 4, the frontward extending portion 24 is formed by a pipe member 24a and extends frontward from the main upper member portion 22 curving downward (See FIG. 1). A vehicle-frontward end portion of the frontward extending portion 24 is joined to an outer member 16.

The outer member 16 is a plate-like member in a rectangular shape when it is viewed from frontward and joined to a front-end portion of a front side frame 12. Moreover, the vehicle-frontward end portion of the frontward extending portion 24 is connected with a front bulkhead 20 through the outer member 16. A vehicle-rearward end portion of the frontward extending portion 24 is fitted into a hole portion 46 formed at a vehicle-frontward end portion 22c of the main upper member portion 22.

As shown in FIG. 1, the front bulkhead 20 is a frame body approximately in a rectangular shape when viewed from frontward and is positioned at a vehicle-frontward end portion that is a front end of the vehicle. The front bulkhead 20 is formed by, for example, a pair of left and right side members, an upper member and a lower member.

The front body portion 10 of the vehicle to which the vehicle front structure of the present embodiment is applied is basically configured as above described and has following actions and effects.

Figure 5A:
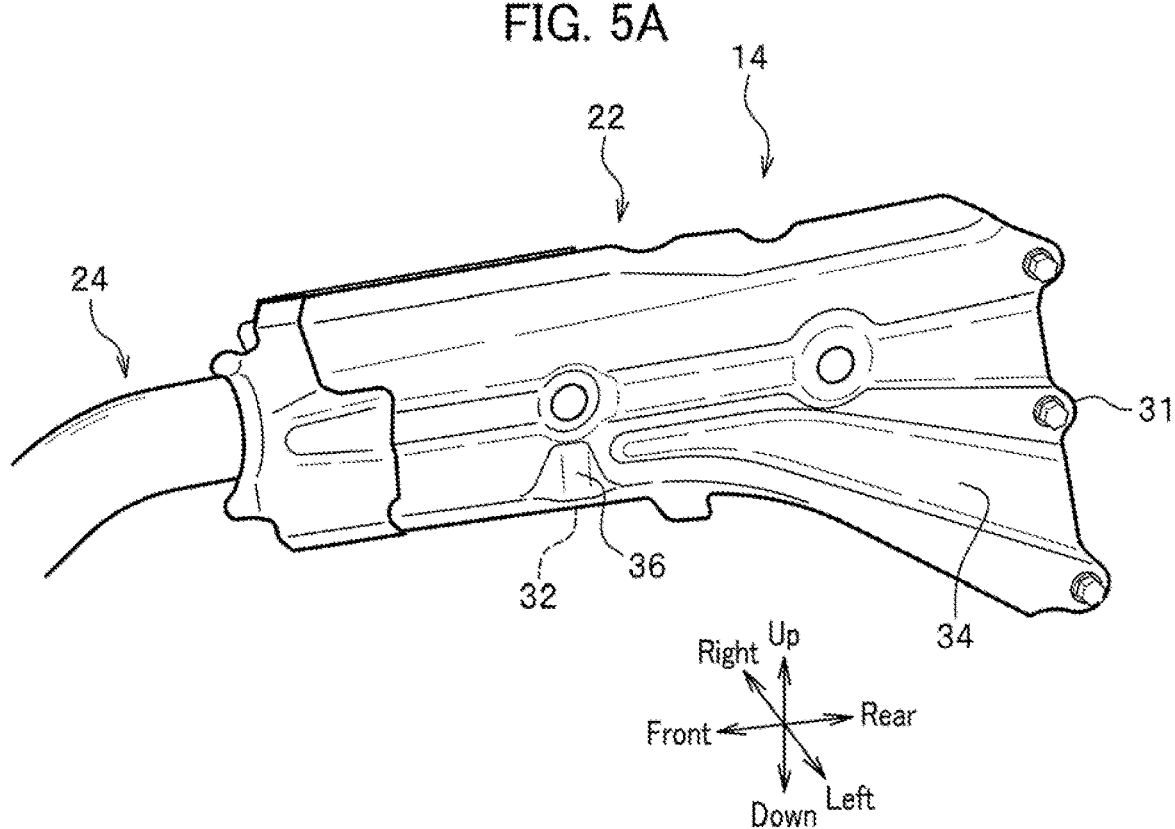
FIG. 5A is a side elevational view of the upper member before a load is applied to the vehicle.
Figure 5B:
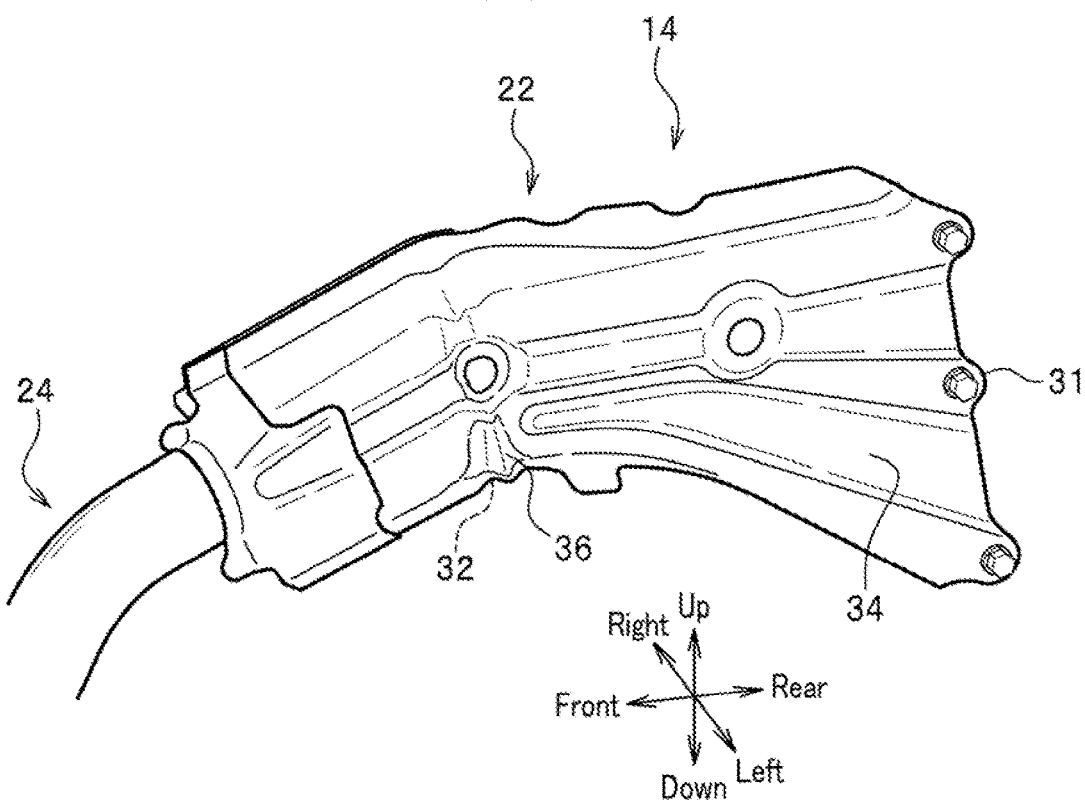
FIG. 5B is a side elevational view of the upper member after a load is applied to the vehicle.

FIG. 5A is a side elevation view of the upper member before a load is applied. FIG. 5B is a side elevation view of the upper member after a load is applied.

According to the present embodiment, the vehicle width direction outer end portion 18a of the damper base 18 is joined to the upper portion 22a of the main upper member portion 22. The pair of left and right indented portions 36, 36 are formed respectively at the left and right corner portions of the lower portion 22b of the main upper member portion 22. In addition, the step portion 32 is formed at the lower portion 22b of the main upper member portion 22 and extends between the pair of left and right indented portions 36, 36.

According to the present embodiment, since the lower portion 22b of the main upper member portion 22 is positioned away in the up-down direction from the upper portion of the main upper body portion 22 that is joined to the damper base 18, the lower portion 22b has a lower stiffness and a lower strength. For example, when the vehicle is in full-lap collision or offset collision (including small-lap collision), a collision load is applied to a front body portion 10 of the vehicle and the indented portions 36, 36, which are respectively positioned at the left and right corner portions of the lower portion 22b of the main upper member portion 22, serve as origin points at which the lower portion 22b of the main upper member portion 22 receiving the collision load starts to bend.

In addition, the step portion 32 extending in the vehicle width direction connects the left and right indented portions 36, 36.

As a result, the upper member 14 bends quickly along the step portion 32 in the present embodiment. Thus, the vehicle front structure of this embodiment has the left and right indented portions 36, 36, which are formed respectively at the left and right corners in the vehicle width direction of the lower portion 22b of the main upper member portion 22 that is disposed away from an upper portion of the main upper member portion 22 and joined to the damper base 18 having relatively high stiffness and strength and positioned, and the step portion 32 that connects and is integrally formed with the left and right indented portions 36, 36. Accordingly, even if the upper member 14 has, for example, a shortened length in the vehicle front-rear direction and is joined to the damper base 18, the upper base 14 reliably bends when the collision load is applied to it (See FIG. 5A and FIG. 5B which show the upper member 14 before and after the load is applied).

As a result, the vehicle front structure of the present embodiment enables increasing the amount of the absorbed load, for example, when the vehicle is in full-lap collision or offset collision (including small-lap collision), even if the upper member 14 is joined to the damper base 18, compared with the conventional vehicle front structure.

In addition, the vehicle front structure of the present embodiment includes the recessed portion 40 positioned at an inward side in the vehicle width direction of the upper member 14 and formed by having a portion of the lower portion 22b of the main upper member portion 22 recessed toward an inside of the main upper member portion 22. The recessed portion 40 is enclosed by the straight ridge portion 42 and the curved ridge portion 44, which are seen respectively straight and curved in the bottom view. The indented portion 36 formed at the inner side in the vehicle width direction is positioned on the recessed portion 40. The step portion 32 is connected to the curved ridge portion 44 of the recessed portion 40.

Since the vehicle front structure of the present embodiment has the upper portion of the upper member 14 that does not include a recessed portion formed thereon and is supported by the damper base 18, the upper portion of the upper member 14 has a sufficiently high stiffness and a sufficiently high strength. On the other hand, since the vehicle front structure of the present embodiment has the lower portion 22b of the main upper member portion 22 which is not supported by the joint to the damper base 18 and has a recessed portion 40 formed thereon, the main upper member 14 more easily bends at the recessed portion 40 on the lower portion 22b of the main upper member portion 22. Since the outer face of the main upper member portion 22 other than the lower portion 22b has no recessed portion 40 formed thereon, the other portion of the main upper member portion 22 than the lower portion 22b can support the load transmitted from the vehicle front side.

In addition, the vehicle front structure of the present embodiment has the main upper member portion 22 including the damper base joined portion 28 and the cowl side portion 30. The damper base joined portion 28 is positioned on the front side of the main upper member portion 22 and formed in a manner that a height dimension in the up-down direction of the damper base joined portion 28 is constant in the vehicle front-rear direction. The cowl side portion 30 is positioned on the rear side of the main upper member portion 22, formed in a manner that a height dimension in the up-down direction of the cowl side portion 30 increases toward its rear end from its front end, and has a vehicle-rearward end portion joined to the front pillar 26. The step portion 32 connecting the pair of the left and right indented portion 36, 36 is formed on the damper base joined portion 28.

The present embodiment enables the main upper member portion 22 to deform to bend along the step portion 32 formed on the lower portion 22b in the damper base 28 whose height dimension in the up-down direction is constant. On the other hand, since the cowl side portion 30 has a height dimension in the up-down direction that increases toward a vehicle-rearward end of the cowl side portion 30 from a vehicle front end of the cowl side portion 30 and the vehicle-rearward end portion of the cowl side portion 30 is joined to the front pillar 26, the cowl side portion 30 of the vehicle front structure of the present embodiment has a high support stiffness and a high support strength against the collision load.

In addition, the cowl side portion 30 of the present embodiment has a raised portion 34 that is formed to be raised outward in the vehicle width direction like a bead and extends toward a vehicle-rearward end of the cowl side portion 30 inclining downward. The vehicle-rearward end portion of the cowl side portion 30 (of the main upper member portion 22) in the vicinity of the raised portion 34 is joined to the front pillar 26 with, for example, such a mechanical joining means as consists of a bolt 35 and a nut.

Since the cowl side portion 30 of the present embodiment has the height dimension increasing from its front end toward its rear end and the raised portion 34 raised like a bead is formed on the cowl side portion 30, the load applied to the front portion of the vehicle can be smoothly transmitted to the front pillar 26. As a result, the upper member 14 of the present embodiment tends to bend at the step portion 32 formed in the damper base joined portion 28.

In addition, the upper member 14 of the present embodiment includes the frontward extending portion 24 extending further frontward of the main upper member portion 22 curving downward. The front body portion 10 includes the outer member 16 joined to the front side frame 12. The vehicle-frontward end portion of the frontward extending portion 24 is joined to the outer member 16.

The vehicle front structure of the present embodiment can efficiently absorb a collision load by having the frontward extending portion 24 deform to bend on a load being transmitted from an outer member 16 at a front end of the front-side frame 12, when the vehicle is in small-lap collision in which a collision object hits an outer portion of the front side frame 12.

In addition, the upper member 14 of the present embodiment can be made to reliably bend at the step portion 32 formed on the lower portion 22b of the main upper member portion 22 in a manner that a portion of the main upper member portion 22 positioned frontward of the step portion 32 curves downward (See FIG. 5B).

Accordingly, the vehicle front structure of the present embodiment, which is installed in a front body positioned frontward of a vehicle compartment and shortened in the vehicle front-rear direction, can have an improved capability of absorbing the collision load. This vehicle front structure is quite helpful for the vehicle body of the electric vehicle in which a small motor is installed instead of a larger internal combustion engine like an engine and which has the front body that is positioned frontward of the vehicle compartment and shortened in the vehicle front-rear direction.

In addition, since the frontward extending portion 24 of the present embodiment is formed of a pipe member 24a, the number of members decreases, which enables increasing productivity and reducing its production cost, compared with the frontward extending portion 24 formed produced by press forming. Additionally, since the pipe member 24 is formed of a single member forming a closed cross section, the pipe member 24 can be made to have a smaller diameter, which can contribute to making the vehicle smaller.

Furthermore, the pipe member 24a of the present embodiment has the vehicle-rearward end portion fitted into the vehicle-frontward end portion 22c of the main upper member portion 22 and the vehicle-frontward end portion joined to the front bulkhead 20 through the outer member 16. As a result, the present embodiment enables the joint portion between the main upper member portion 22 and the frontward extending portion 24 to have relatively high stiffness and strength, which contributes to the vehicle front structure smoothly deforming to bend through plural steps and efficiently absorbing the collision load.

What is claimed is:

1. A vehicle front structure comprising:
a pair of left and right upper members disposed respectively on left and right sides of a vehicle and extending in a vehicle front-rear direction; and
a pair of left and right damper bases in each of which a damper is fitted,
wherein each of the upper members includes a main upper member portion having a cross section in a rectangular shape that is perpendicular to an axis thereof,
the left and right damper bases are joined respectively to upper portions of the main upper member portions, and each of the main upper member portions includes a lower portion including a pair of indented portions formed at both left and right corner portions in a vehicle width direction of the lower portion and a step portion formed to extend in the vehicle width direction and connect the pair of the indented portions.

2. The vehicle front structure as claimed in claim 1, wherein a recessed portion is positioned at an intermediate position in the vehicle width direction of the each of the main upper member portions and on a lower portion of the each of the main upper member portions, is formed to be recessed toward an inside of the main upper member portion from the lower portion, and has a ridge line portion that is seen curving in a bottom plan view of the upper member, and wherein an indented portion is formed on the recessed portion, and the step portion extends from the recessed portion.

3. The vehicle front structure as claimed in claim 1,
wherein the main upper member portion includes a damper base joined portion and a cowl side portion, the damper base joined portion being positioned on a front side of the main upper member portion and formed to have a height dimension in an up-down direction constant in a vehicle front-rear direction, and the cowl side portion being positioned on a rear side of the main upper member portion, having a height dimension in the up-down direction increasing toward a vehicle-rearward end of the cowl side portion from a frontward end of the cowl side portion and having a vehicle-rearward end portion joined to the front pillar, and
wherein the step portion is formed on the damper base joined portion.

4. The vehicle front structure as claimed in claim 3, wherein the cowl side portion includes a raised portion in a bead shape that is raised outward in the vehicle width direction and extends rearward in a vehicle front-rear direction inclining downward, and is joined in a vicinity of the raised portion to the front pillar with a mechanical joint member.

5. The vehicle front structure as claimed in claim 4, wherein the upper member includes a frontward extending portion extending frontward in the vehicle front-rear direction from the main upper member portion curving downward, and an outer member joined to a front-end portion of a front side frame, and
wherein a vehicle-frontward end portion of the frontward extending portion is joined to the outer member.

6. The vehicle front structure as claimed in claim 5, wherein the frontward extending portion is formed by a pipe member.

7. The vehicle front structure as claimed in claim 6, wherein a vehicle-rearward end portion of the frontward extending portion is fitted into a vehicle-frontward end portion of the main upper member portion, and a vehicle-frontward end portion of the pipe member is joined to a front bulkhead through the outer member.

* * * * *